(12) United States Patent
Moriya et al.

(10) Patent No.: US 8,024,096 B2
(45) Date of Patent: Sep. 20, 2011

(54) CONTROL DEVICE AND CONTROL METHOD FOR VEHICLE

(75) Inventors: Naoto Moriya, Toyota (JP); Yoshio Hasegawa, Chiryu (JP); Nobufusa Kobayashi, Chiryu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 337 days.

(21) Appl. No.: 12/457,436

(22) Filed: Jun. 10, 2009

(65) Prior Publication Data

US 2009/0312924 A1    Dec. 17, 2009

(30) Foreign Application Priority Data

Jun. 17, 2008   (JP) ................. 2008-158273

(51) Int. Cl.
    *G06F 7/00*    (2006.01)
(52) U.S. Cl. .......................................... 701/58
(58) Field of Classification Search ............. 701/51–53, 701/58; 475/120, 123, 125, 127, 129
    See application file for complete search history.

(56) References Cited

U.S. PATENT DOCUMENTS 6,302,822 B1 * 10/2001 Suzuki et al. ................. 477/143
6,464,610 B1 * 10/2002 Hisano et al. ................. 475/119

FOREIGN PATENT DOCUMENTS

| JP | A-61-105228 | 5/1986 |
|----|-------------|--------|
| JP | A-2-245568 | 10/1990 |
| JP | A-5-263913 | 10/1993 |
| JP | A-9-21460 | 1/1997 |
| JP | A-10-227356 | 8/1998 |
| JP | A-2003-287122 | 10/2003 |
| JP | A-2007-46630 | 2/2007 |

OTHER PUBLICATIONS

Notification of Reason(s) for Refusal for Japanese Application No. 2008-158273, issued on Apr. 20, 2010 (w/ partial translation).

* cited by examiner

*Primary Examiner* — Kim T Nguyen

(74) *Attorney, Agent, or Firm* — Oliff & Berridge PLC

(57) ABSTRACT

When an automatic transmission is shifted from neutral to a forward gear, an ECU calculates the appropriate target gear. If the target gear speed is the second forward gear or higher, a target command pressure of a first engagement element is immediately increased to a maximum pressure regardless of an input torque, and a target command pressure of a second engagement element is gradually increased in accordance with the input torque.

6 Claims, 8 Drawing Sheets

FIG.3

|     | C1 | C2 | C3 | C4 | B1 | B2 | F |
|-----|----|----|----|----|----|----|----|
| P   | ×  | ×  | ×  | ×  | ×  | ×  | × |
| R1  | ×  | ×  | ○  | ×  | ×  | ○  | × |
| R2  | ×  | ×  | ×  | ○  | ×  | ○  | × |
| N   | ×  | ×  | ×  | ×  | ×  | ×  | × |
| 1ST | ○  | ×  | ×  | ×  | ×  | ◎  | △ |
| 2ND | ○  | ×  | ×  | ×  | ○  | ×  | × |
| 3RD | ○  | ×  | ○  | ×  | ×  | ×  | × |
| 4TH | ○  | ×  | ×  | ○  | ×  | ×  | × |
| 5TH | ○  | ○  | ×  | ×  | ×  | ×  | × |
| 6TH | ×  | ○  | ×  | ○  | ×  | ×  | × |
| 7TH | ×  | ○  | ○  | ×  | ×  | ×  | × |
| 8TH | ×  | ○  | ×  | ×  | ○  | ×  | × |

○ ENGAGED
× RELEASED
◎ ENGAGED DURING ENGINE BRAKING
△ ENGAGED ONLY DURING DRIVING

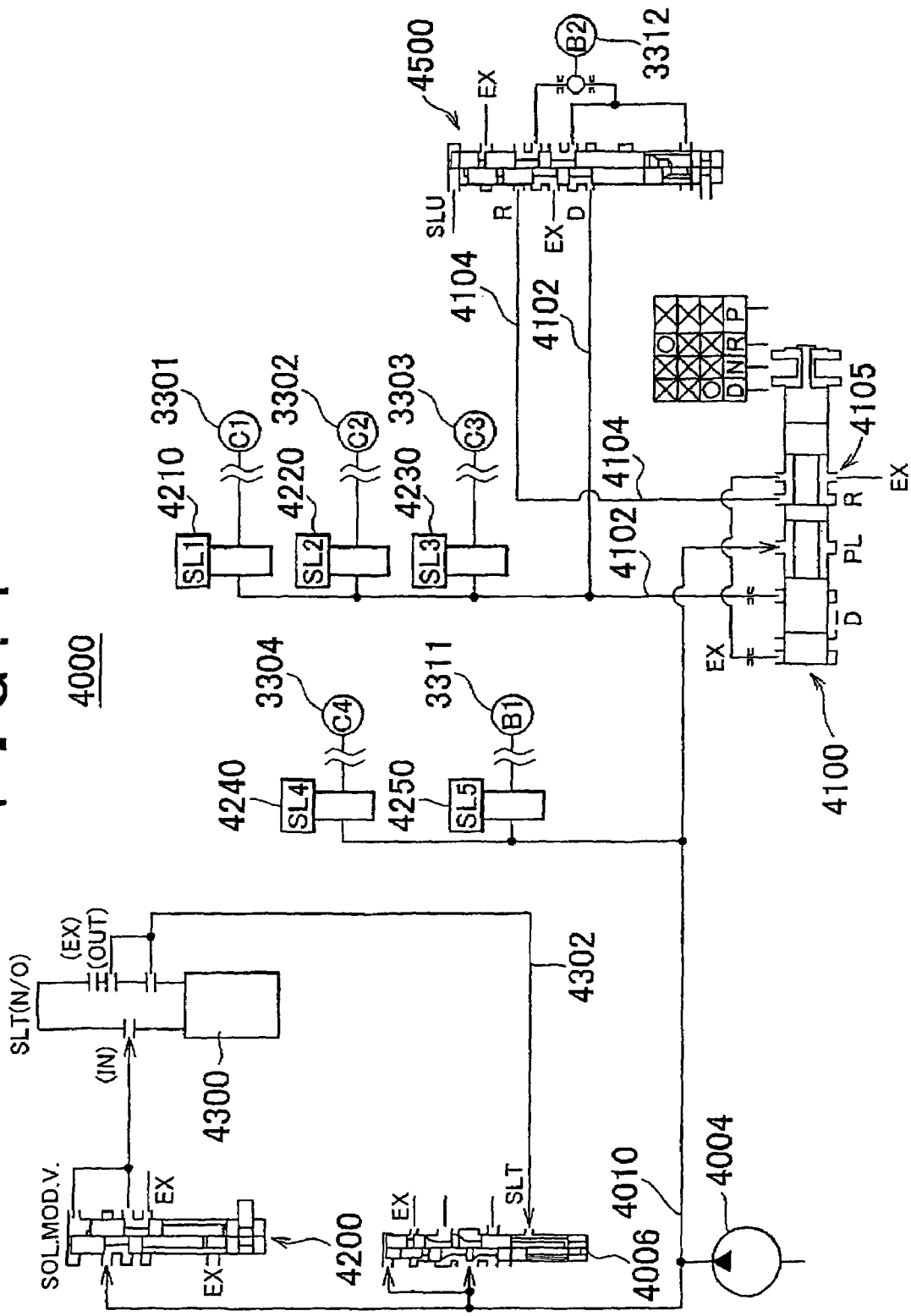

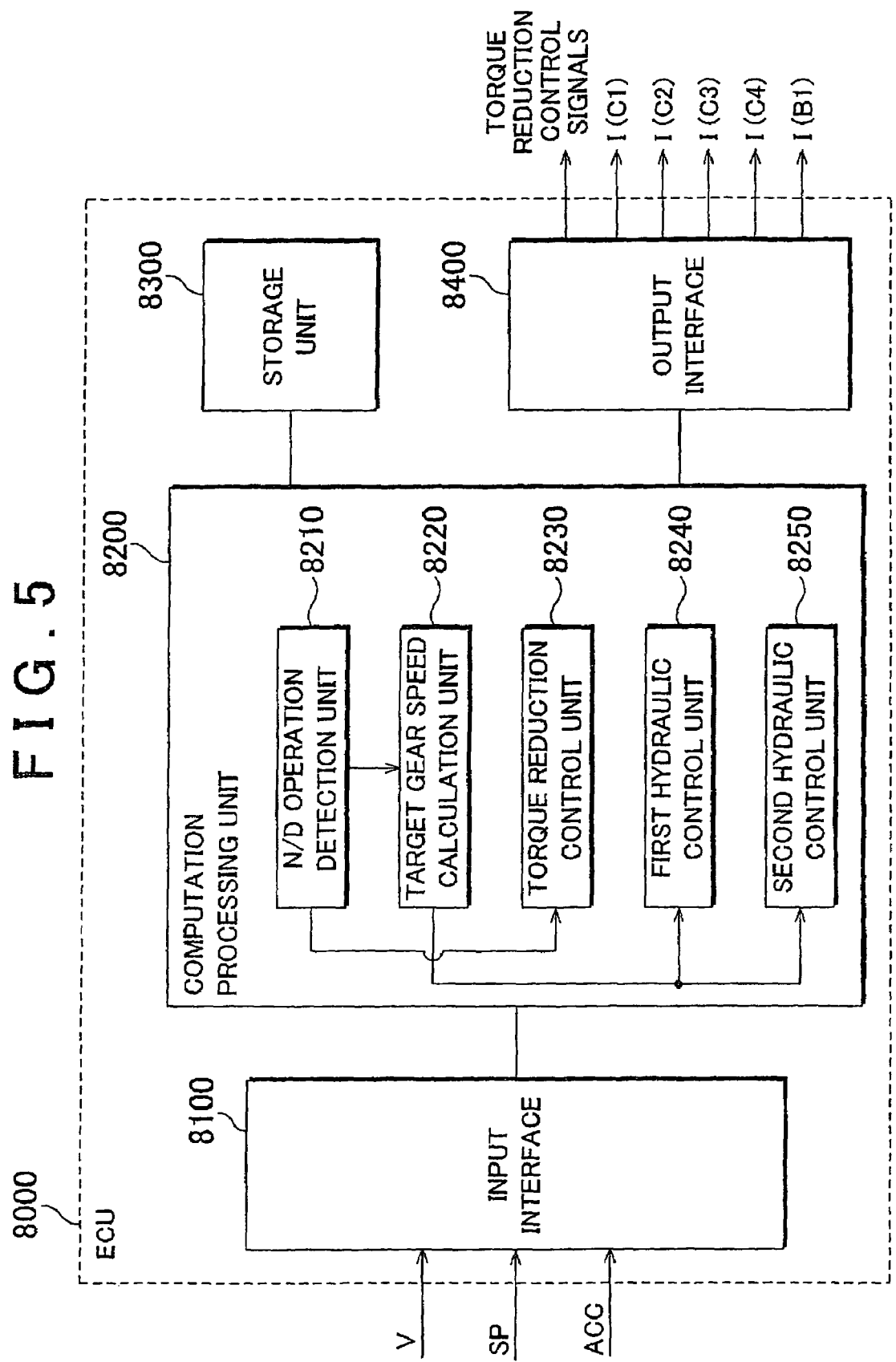

CONTROL DEVICE AND CONTROL METHOD FOR VEHICLE

INCORPORATION BY REFERENCE

The disclosure of Japanese Patent Application No. 2008-158273 filed on Jun. 17, 2008 including the specification, drawings and abstract is incorporated herein by reference in its entirety.

BACKGROUND OF THE INVENTION

1. Field of the Invention

The present invention relates to control device and a control method for a vehicle equipped with an automatic transmission. More specifically, the present invention relates to a vehicle control for switching a shift lever position selected by the driver from a neutral position to a forward drive position.

2. Description of the Related Art

In a vehicle equipped with an automatic transmission, the driver may move the shift lever in order to change shift lever position from a neutral position (referred to as an "N position" below) to a forward drive position (referred to as a "D position" below), which will be referred to as an "N/D operation" below. Friction engagement elements that were released are consequently engaged such that the automatic transmission switches from neutral to the D-range. Significant shift shock may be generated if the driver depresses the accelerator pedal immediately after performing an N/D operation. Art for suppressing such shift shock is described in Japanese Patent Application Publication No. JP-A-61-105228, for example.

The control device for an automatic transmission described in JP-A-61-105228 includes: a shift operation sensor that detects an operation to shift from a stop range to a running range; a vehicle speed sensor that detects a vehicle speed; an engine speed sensor that detects an engine speed; and an output torque reduction unit that reduces the engine output torque alongside a transition to engaging a running-range friction engagement device when there is an operation to shift from the stop range to the running range while the vehicle speed is equal to or less than a predetermined vehicle speed, and when the engine speed becomes equal to or greater than a predetermined engine speed within a predetermined time since the shift operation.

According to the control device for an automatic transmission described in JP-A-61-105228, if the driver attempts to perform a shift operation and immediately start moving the vehicle (that is, when there is an operation to shift from the stop range to the running range while the vehicle speed is equal to or less than a predetermined vehicle speed, and the engine speed becomes equal to or greater than a predetermined engine speed within a predetermined time since the shift operation) the engine output torque is reduced when engaging the D-range friction engagement device. Therefore, the torque borne by the D-range friction engagement device upon engagement thereof is kept within a tolerance value and sudden fluctuations in the output shaft torque of the automatic transmission upon engagement of the D-range friction engagement device are suppressed. The shift shock and shock load can thus be alleviated. There is also no need to delay the engagement of the running-range friction engagement device, so a delay in starting vehicle travel may be avoided.

However, if the above N/D operation is performed while the vehicle is in motion, it may be necessary to engage two friction engagement elements in order to form a gear higher than the forward first gear. If the accelerator pedal is depressed immediately after performing the N/D operation, leads to the engagement of the friction engagement elements, as well as an increase in the torque input to the friction engagement elements. Accordingly, the hydraulic pressure to the friction engagement elements must also be increased in order to prevent slipping of the friction engagement elements. This may consequently generate engagement shock due to the imbalance between the engagement state of one friction engagement element and the engagement state of the other friction engagement element.

In order to appropriately suppress such engagement shock, until the friction engagement elements are completely engaged, the output torque of a drive source (an input torque of the automatic transmission) may be decreased considerably more than when only one friction engagement element is engaged. However, this means that the vehicle does not accelerate even though the accelerator is being depressed, and gives the driver a sense of incongruity.

JP-A-61-105228 and Japanese Patent Application Publication No. JP-A-2003-287122 do not provide any solution to the above problem.

SUMMARY OF THE INVENTION

The present invention provides a control device and a control method that suppress engagement shock while realizing travel in line with a driver's intent when the automatic transmission is shifted from neutral into a drive gear.

A control device for a vehicle according to a first aspect of the present invention, wherein the vehicle includes a plurality of engagement elements that is released when a shift lever position is in a neutral position; a hydraulic circuit that controls a hydraulic pressure of oil fed to the plurality of engagement elements; and an automatic transmission that changes a speed of and outputs a rotation of a drive source, the control device including: a determination unit that determines whether the shift lever position has been changed from the neutral position to a forward running position; a torque reduction unit that controls the drive source such that an output torque of the drive source is lower than a torque in accordance with an accelerator opening, if the determination unit determines that the shift lever position has been changed to the forward running position; a calculation unit that calculates a target gear speed in accordance with a vehicle speed, if it is determined by the determination unit that the shift lever position has been changed to the forward running position; and a control unit that controls the hydraulic circuit such that a first engagement element that is part of the two or more engagement elements is engaged before engagement of a second engagement element, if the target gear speed calculated by the calculation unit is a gear speed formed by engaging at least two or more engagement elements.

In addition to the configuration of the first aspect, the control unit may increase a hydraulic pressure fed to the first engagement element to a predetermined hydraulic pressure, and then increase a hydraulic pressure fed to the second engagement element, Further, the control unit may set such that a time elapsed from the when the hydraulic pressure fed to the first engagement element starts increasing until a maximum pressure is reached is shorter than a time elapsed from when the hydraulic pressure fed to the second engagement element starts increasing until a maximum pressure is reached.

The control unit may also increase the hydraulic pressure fed to the first engagement element regardless of an input torque that is input from the drive source to the automatic transmission, and increase the hydraulic pressure fed to the second engagement element in accordance with the input torque.

If the two or more engagement elements are a combination of a primary engagement element through which the input torque is output from the automatic transmission even if singly engaged, and a secondary engagement element through which the input torque from the automatic transmission is not output if singly engaged, the control unit may immediately increase a hydraulic pressure fed to the secondary engagement element to a maximum pressure regardless of the input torque, and increase a hydraulic pressure fed to the primary engagement element in accordance with the input torque.

If the two or more engagement elements are a combination of primary engagement elements through which the input torque is output from the automatic transmission even if singly engaged, the control unit may increase a hydraulic pressure fed to part of the primary engagement elements in a preset manner regardless of the input torque, and increase a hydraulic pressure fed to the remaining primary engagement elements in accordance with the input torque.

A control method for a vehicle according to a second aspect of the present invention, wherein the vehicle includes a plurality of engagement elements that is released when a shift lever position is in a neutral position; a hydraulic circuit that controls a hydraulic pressure of oil fed to the plurality of engagement elements; and an automatic transmission that changes a speed of and outputs a rotation of a drive source, the control method including: determining whether the shift lever position has been changed from the neutral position to a forward running position; controlling the drive source such that an output torque of the drive source is lower than a torque in accordance with an accelerator opening, if it is determined that the shift lever position has been changed to the forward running position; calculating a target gear speed in accordance with a vehicle speed, if it is determined that the shift lever position has been changed to the forward running position; and controlling the hydraulic circuit such that a first engagement element that is part of the two or more engagement elements is engaged before engagement of a second engagement element, if the target gear speed is a gear speed formed by engaging at least two or more engagement elements. The second aspect of the present invention may include the same conditions as the first aspect described above.

According to the first and second aspects of the present invention, if the driver changes the shift lever position from the neutral position to a forward running position, and the target gear speed calculated in accordance with the vehicle speed is a gear speed formed by engagement at least two or more engagement elements, the first engagement element that is part of the two or more engagement elements is engaged before engagement of the second engagement element. Accordingly, fluctuations in the balance between the engagement state of the first engagement element and the engagement state of the second engagement element can be suppressed. It is therefore possible to suppress engagement shock without excessively lowering an output torque of the drive source. As a consequence, travel in line with the driver's intent can be achieved where the vehicle is accelerated in accordance with the depression of the accelerator while suppressing engagement shock.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 3 shows an operational chart of the automatic transmission;

FIG. 4 shows a hydraulic circuit of the automatic transmission;

FIG. 5 is a functional block diagram of an ECU;

DETAILED DESCRIPTION OF THE EMBODIMENTS

Figure 1:
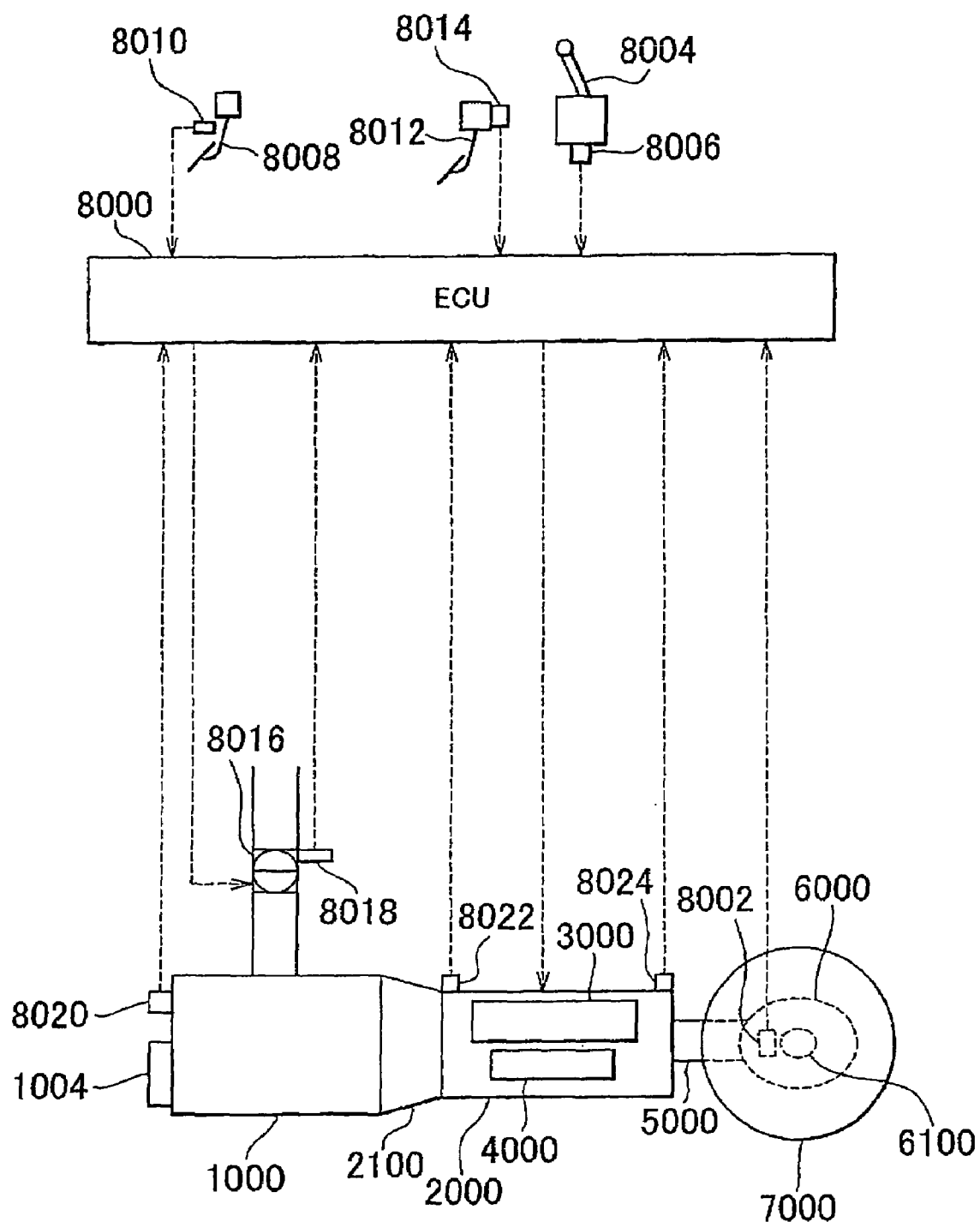
FIG. 1 is a schematic structural diagram that shows a power train of a vehicle.

Embodiments of the present invention will be described below with reference to the accompanying drawings. Like elements are represented by like reference numerals, and the names and functions of such elements are identical. For this reason, repeated detailed descriptions of these elements will not be given below.

A vehicle equipped with a control device according to an embodiment of the present invention will be explained with reference to FIG. 1. The vehicle shown is a front-engine rear-drive (FR) vehicle, but the control device may also be used in a non-FR vehicle.

The vehicle includes an engine 1000, an automatic transmission 2000, a torque converter 2100, a planetary gear unit 3000 that forms part of the automatic transmission 2000, a hydraulic circuit 4000 that forms part of the automatic transmission 2000, a propeller shaft 5000, a differential gear 6000, rear wheels 7000, and an electronic control unit (ECU) 8000. The control device according to the present embodiment may be implemented by executing a program stored in a read-only memory (ROM) of the ECU 8000, for example.

The engine 1000 is an internal combustion engine that combusts a mixture of air and fuel injected from injectors (not shown) inside a combustion chamber of a cylinder. The combustion presses down a piston inside the cylinder, which rotates a crankshaft. An auxiliary device 1004 such as an alternator and an air conditioner are driven by the driving force of the engine 1000. Note that a motor may also be used as a drive source in addition to or in place of the engine 1000.

The automatic transmission 2000 is connected with the engine 1000 via the torque converter 2100. The automatic transmission 2000 forms a desired gear speed in order to shift a rotational speed of the crankshaft to a desired rotational speed. The driving force output from the automatic transmission 2000 is transmitted to the right and left rear wheels 7000 via the propeller shaft 5000 and the differential gear 6000.

The ECU 8000 is connected via a harness, for example, with a vehicle speed sensor 8002; a position switch 8006 of a shift lever 8004; an accelerator operation amount sensor 8010 of an accelerator pedal 8008; a depression force sensor 8014 of a brake pedal 8012; a throttle opening sensor 8018 of an electronic throttle valve 8016; an engine speed sensor 8020; an input shaft speed sensor 8022, and an output shaft speed sensor 8024.

The vehicle speed sensor 8002 detects a vehicle speed V based on the rotational speed of a drive shaft 6100. The position switch 8006 detects the position (a shift position) SP of the shift lever 8004. The accelerator operation amount sensor 8010 detects the operation amount ACC of the accelerator pedal 8008. The depression force sensor 8014 detects the depression force on the brake pedal 8012. The throttle opening sensor 8018 detects the throttle opening amount TH of the electronic throttle valve 8016. The engine speed sensor 8020 detects the crankshaft speed (an engine speed) NE. The input shaft speed sensor 8022 detects the input shaft speed (a turbine speed of the torque converter 2100) NT of the automatic transmission 2000. The output shaft speed sensor 8024 detects the rotational speed (an output shaft speed) NOUT of the output shaft of the automatic transmission 2000. These sensors send signals that represent the detection results to the ECU 8000.

The ECU 8000 controls various devices such that the vehicle achieves a desired running state based on maps and programs stored in the ROM, and the signals sent from the vehicle speed sensor 8002, the position switch 8006, the accelerator operation amount sensor 8010, the depression force sensor 8014, the throttle opening sensor 8018, the engine speed sensor 8020, the input shaft speed sensor 8022, the output shaft speed sensor 8024, and the like.

According to the present embodiment, when the shift lever 8004 is in the D position, the D range of the automatic transmission is selected. Accordingly, the ECU 8000 controls the automatic transmission 2000 such that any gear speed among a forward first to eighth speeds is formed. The automatic transmission 2000 is capable of transmitting a driving force to the rear wheels 7000 based on the gear speed formed among the forward first to eighth speeds. Note that in the D range, it may also be possible to form a higher gear speed than eighth speed.

The ECU 8000 calculates a target gear based on a shift diagram, which is prepared beforehand from testing or the like using the vehicle speed V and the accelerator operation amount ACC as parameters, and controls the automatic transmission 2000 to form the calculated target gear. Note that the shift diagram is at least set such that a higher target gear is calculated for a faster vehicle speed V.

Although the ECU 8000 is described as one unit in the present embodiment, the ECU 8000 may be divided into two or more units. For example, the ECU 8000 may be configured to include an engine ECU that controls the engine 1000 and an electronic control transmission (ECT) ECU that controls the automatic transmission 2000, with the engine ECU and the ECT ECU capable of sending and receiving signals to and from one another.

Figure 2:
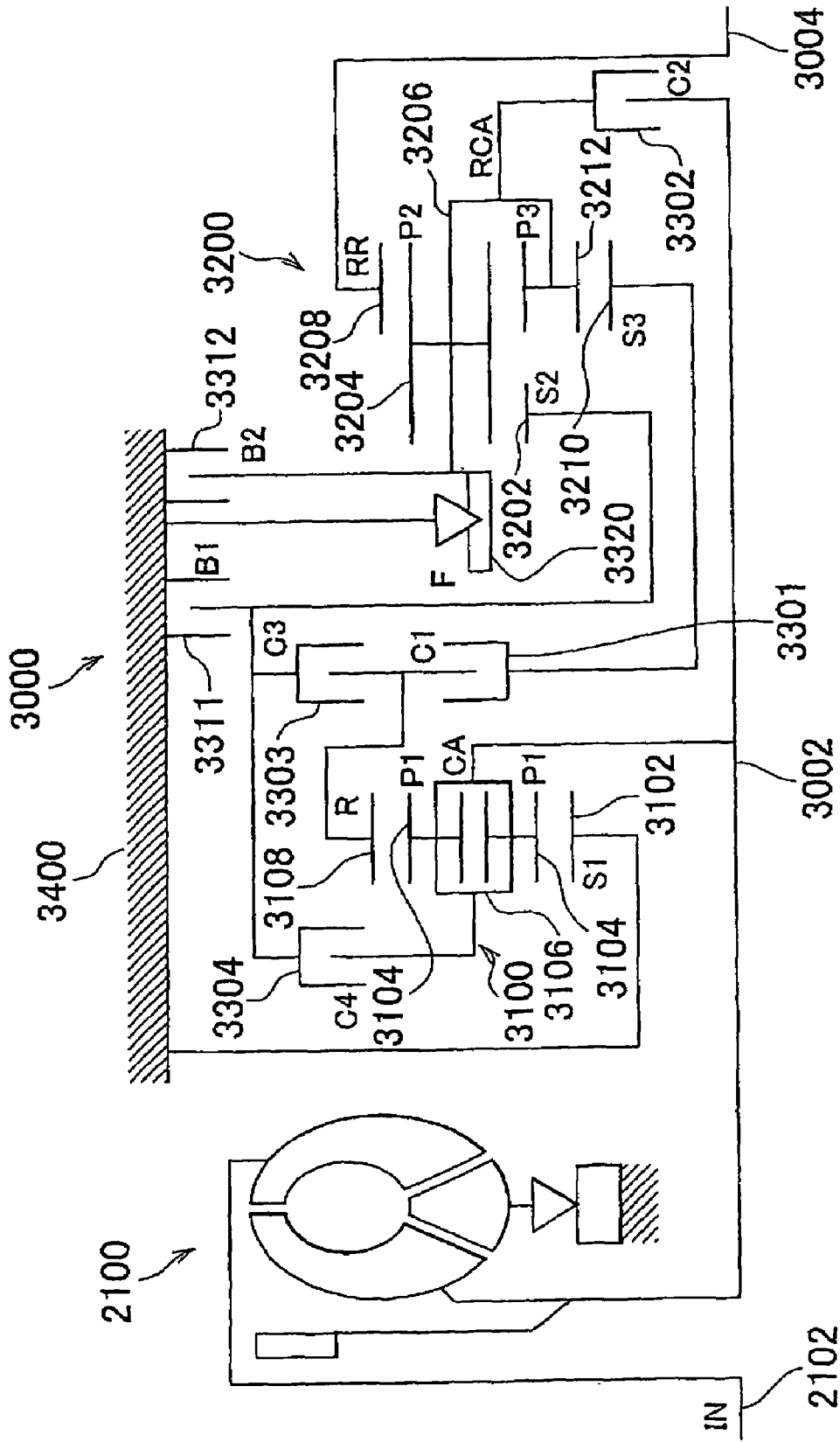
FIG. 2 is a skeleton diagram that shows a planetary gear unit of an automatic transmission.

The planetary gear unit 3000 will be explained next with reference to FIG 2. The planetary gear unit 3000 is connected with the torque converter 2100, which has an input shaft 2102 that is coupled with the crankshaft.

The planetary gear unit 3000 includes a front planetary gear set 3100, a rear planetary gear set 3200, a C1 clutch 3301, a C2 clutch 3302, a C3 clutch 3303, a C4 clutch 3304, a B1 brake 3311, a B2 brake 3312, and a one-way clutch (F) 3320.

The front planetary gear set 3100 is a double-pinion planetary gear mechanism. The front planetary gear set 3100 includes a first sun gear (S1) 3102, a pair of first pinion gears (P1) 3104, a first carrier (CA) 3106, and a first ring gear (R) 3108.

The first pinion gear (P1) 3104 meshes with the first sun gear (S1) 3102 and the first ring gear (R) 3108. The first carrier (CA) 3106 supports the first pinion gear (P1) 3104 such that the first pinion gear (P1) 3104 is capable of orbiting and rotating.

The first sun gear (S1) 3102 is fixed to the gear case 3400 and held stationary. The first carrier (CA) 3106 is coupled with an input shaft 3002 of the planetary gear unit 3000.

The rear planetary gear set 3200 is a Ravigneaux planetary gear mechanism. The rear planetary gear set 3200 includes a second sun gear (S2) 3202, a second pinion gear (P2) 3204, a rear carrier (RCA) 3206, a rear ring gear (RR) 3208, a third sun gear (S3) 3210, and a third pinion gear (P3) 3212.

The second pinion gear (P2) 3204 meshes with the second sun gear (S2) 3202, the rear ring gear (RR) 3208, and the third pinion gear (P3) 3212. The third pinion gear (P3) 3212 meshes with the third sun gear (S3) 3210, in addition to the second pinion gear (P2) 3204.

The rear carrier (RCA) 3206 supports the second pinion gear (P2) 3204 and the third pinion gear (P3) 3212 such that the second pinion gear (P2) 3204 and the third pinion gear (P3) 3212 are capable of orbiting and rotating. The rear carrier (RCA) 3206 is coupled with the one-way clutch (P) 3320. The rear carrier (RCA) 3206 is held stationary when the transmission is in first gear (during running that uses the driving force output from the engine 1000). The rear ring gear (RR) 3208 is coupled with an output shaft 3004 of the planetary gear unit 3000.

The one-way clutch (F) 3320 is provided in parallel with the B2 brake 3312. Namely, an outer race of the one-way clutch (F) 3320 is fixed to the gear case 3400, and an inner race of the one-way clutch (F) 3320 is coupled with the Tear carrier (RCA) 3206.

The C1 clutch 3301 and the C2 clutch 3302 are friction engagement elements (referred to as "primary engagement elements" where appropriate), and torque input to the input shaft 3002 (referred to simply as "input torque" below) is output to the output shaft 3004 through the independent engagement of the C1 clutch 3301 and the C2 clutch 3302.

The C3 clutch 3303, the C4 clutch 3304, the B1 brake 3311, and the B2 brake 3312 are friction engagement elements (referred to as "secondary engagement elements" where appropriate) that are subjected to a reaction force when one of the primary engagement elements is engaged; input torque is not output to the output shaft 3004 through only their single engagement.

FIG. 3 shows an operation chart that expresses the relationship between the transmission gear speeds and the operation states of the clutches and brakes. The first to eighth forward gears and first and second reverse gears are formed by operating the brakes and clutches according to the combinations indicated in the operation chart.

To form the first forward gear, as shown in FIG. 3, the ECU 8000 engages the C1 clutch 3301, which is a primary engagement element, and releases the other clutches and brakes.

To form the second forward gear, for example, the ECU 8000 engages the C1 clutch 3301, which is a primary engagement element, and the B1 brake 3311, which is a secondary engagement element, and releases the other clutches and brakes.

To form the fifth forward gear, for example, the ECU 8000 engages the C1 clutch 3301 and the C2 clutch 3301, which are both primary engagement elements, and releases the other clutches and brakes.

The hydraulic circuit 4000 will be explained next with reference to FIG 4. However, it should be noted that the hydraulic circuit 4000 is not limited by the description below.

The hydraulic circuit 4000 includes an oil pump 4004, a primary regulator valve 4006, a manual valve 4100, a solenoid modulator valve 4200, an SL1 linear solenoid (also referred to as SL(1) below) 4210, an S12 linear solenoid (also referred to as SL(2) below) 4220, an SL3 linear solenoid (also referred to as SL(3) below) 4230, an SL4 linear solenoid (also referred to as SL(4) below) 4240, an SL5 linear solenoid (also referred to as SL(5) below) 4250, an SLT linear solenoid (also referred to as SLT below) 4300, and a B2 control valve 4500.

The oil pump 4004 is coupled with the crankshaft of the engine 1000. Rotation of the crankshaft drives the oil pump 4004 to thereby generate hydraulic pressure.

The hydraulic pressure generated by the oil pump 4004 is adjusted to a line pressure by the primary regulator valve 4006. The primary regulator valve 4006 operates using a throttle pressure adjusted by the SLT 4300 as a pilot pressure. Oil at the line pressure is fed to the manual valve 4100 via a line pressure oil passage 4010.

The manual valve 4100 includes a drain port 4105. Oil is discharged from the drain port 4105 to a D-range pressure oil passage 4102 and an R-range pressure oil passage 4104.

When a spool of the manual valve 4100 is set to the D position, the line pressure oil passage 4010 is communicated with the D-range pressure oil passage 4102, and oil having the D-range pressure is fed to the D-range pressure oil passage 4102. At such time, the R-range pressure oil passage 4104 is communicated with the drain port 4105, and the oil in the R-range pressure oil passage 4104 is discharged from the drain port 4105.

When the spool of the manual valve 4100 is set to the R position, the line pressure oil passage 4010 is communicated with the R-range pressure oil passage 4104, and oil having the R-range pressure is fed to the R-range pressure oil passage 4104. At such time, the D-range pressure oil passage 4102 is communicated with the drain port 4105, and oil having the D-range pressure of the D-range pressure oil passage 4102 is discharged from the drain port 4105.

When the spool of the manual valve 4100 is set to the N position, both the D-range pressure oil passage 4102 and the R-range pressure oil passage 4104 are communicated with the drain port 4105. Oil having the D-range pressure of the D-range pressure oil passage 4102 and oil having the R-range pressure of the R-range pressure oil passage 4104 are then discharged from the drain port 4105.

The B2 control valve 4500 selectively feeds oil from either the D-range pressure oil passage 4102 or the R-range pressure oil passage 4104 to the B2 brake 3312. The B2 control valve 4500 is connected with the D-range pressure oil passage 4102 and the R-range pressure oil passage 4104. The B2 control valve 4500 is controlled by a biasing force of a spring and oil fed from an SLU solenoid valve (not shown).

If the SLU solenoid valve is on, the B2 control valve 4500 is set to the state shown on the left side of FIG. 4. In such case, the B2 brake 3312 is supplied with oil pressurized to the D-range pressure, with the hydraulic pressure of oil supplied from the SLU solenoid valve used as the pilot pressure. It should be noted that oil supplied to the D-range pressure oil passage 4102 is ultimately fed to the C1 clutch 3301, the C2 clutch 3302, and the C3 clutch 3303.

If the SLU solenoid valve is off, the B2 control valve 4500 is set to the state shown on the right side of FIG. 4. In such case, the B2 brake 3312 is supplied with oil at the R-range pressure of the R-range pressure oil passage 4104.

The SL(1) 4210, the SL(2) 4220, the SL(3) 4230, the SL(4) 4240, and the SL(5) 4250 are normally-closed linear solenoid valves. The output hydraulic pressure of the linear solenoid valves is controlled by drive currents I, which serve as drive signals, output from the ECU 8000 to the respective linear solenoid valves. In other words, the output hydraulic pressure of the linear solenoid valves is at a minimum ("0") when no current is conducted, with the output hydraulic pressure increases as the drive currents I from the ECU 8000 increase.

The hydraulic pressure of oil fed to the C1 clutch 3301 is adjusted by the SL(1) 4210. The hydraulic pressure of oil fed to the C2 clutch 3302 is adjusted by the SL(2) 4220. The hydraulic pressure of oil fed to the C3 clutch 3303 is adjusted by the SL(3) 4230. The hydraulic pressure of oil fed to the C4 clutch 3304 is adjusted by the SL(4) 4240. The hydraulic pressure of oil fed to the B1 brake 3311 is adjusted by the SL(5) 4250.

Based on the input torque and the like, the ECU 8000 respectively calculates a target command pressure P(C1) of the C1 clutch 3301, a target command pressure P(C2) of the C2 clutch 3302, a target command pressure P(C3) of the C3 clutch 3303, a target command pressure P(C4) of the C4 clutch 3304, and a target command pressure P(B1) of the B1 brake 3311.

The ECU 8000 outputs a drive current I(C1) that corresponds to the target command pressure P(C1), a drive current I(C2) that corresponds to the target command pressure P(C2), a drive current I(C3) that corresponds to the target command pressure P(C3), a drive current I(C4) that corresponds to the target command pressure P(C4), and a drive current I(B1) that corresponds to the target command pressure P(B1) to the SL(1) 4210, the SL(2) 4220, the SL(3) 4230, the SL(4) 4240, and the SL(5) 4250, respectively.

With the line pressure as a source pressure, the solenoid modulator valve 4200 adjusts the hydraulic pressure (a solenoid modulator pressure) of oil that is fed to the SLT 4300 to a prescribed pressure.

The SLT 4300 adjusts the solenoid modulator pressure and adjusts the oil to the throttle pressure in accordance with the drive current I(T) from the ECU 8000, which is based on the accelerator operation amount ACC detected by the accelerator operation amount 8010 and the like. Oil at the throttle pressure is fed to the primary regulator valve 4006 via an SLT oil passage 4302. The throttle pressure is used as a pilot pressure for the primary regulator valve 4006.

In a vehicle having the above configuration, if an N/D operation is performed when the vehicle is stopped, the forward first gear is set as the target gear and one friction engagement element, the C1 clutch 3301, is engaged. However, if the N/D operation is performed while the vehicle is in motion, one of the second to eighth forward gears is set as the target gear speed, due to the high vehicle speed V. Therefore, two friction engagement elements must be engaged as shown in the operation chart of FIG. 3.

According to the present embodiment, if the N/D operation is performed while the vehicle is in motion, and two or more (two in the present embodiment) friction engagement elements must be engaged, at least one of the friction engagement elements are engaged before the remaining friction engagement elements.

FIG. 5 shows a functional block diagram of the ECU 8000, which is a control device for a vehicle according to the present embodiment. The ECU 8000 includes an input interface 8100, a computation processing unit 8200, a storage unit 8300, and an output interface 8400.

The input interface 8100 receives the vehicle speed V from the vehicle speed sensor 8002, the shift position SP from the position switch 8006, and the accelerator operation amount ACC from the accelerator operation amount sensor 8010, and sends these to the computation processing unit 8200.

The storage unit 8300 stores various information and programs, as well as threshold values and maps that include the above shift diagram. The storage unit 8300 reads out and stores data from the computation processing unit 8200 as necessary.

The computation processing unit 8200 includes an N/D operation sensor 8210, a target gear speed calculation unit 8220, a torque reduction control unit 8230, a first hydraulic control unit 8240, and a second hydraulic control unit 8250.

The N/D operation sensor 8210 detects an N/ID operation based on the shift position SP.

The target gear calculation unit 8220 calculates the target gear based on the vehicle speed V, the accelerator operation amount ACC, and the shift diagram when the N/ID operation sensor 8210 detects that an N/D operation has been performed.

If the accelerator pedal 8008 is depressed between the time from detection by the N/D operation sensor 8210 of an N/D operation and formation of the target gear, the torque reduction control unit 8230 executes a torque reduction control that adjusts an intake air volume (a throttle opening TH) to reduce the output torque of the engine 1000 below a normal value in accordance with the accelerator operation amount ACC. Accordingly, the engine torque input to the automatic transmission 2000 is decreased, and engagement shock is suppressed. Also note that the torque reduction control may be executed by controlling the fuel injection amount or ignition timing of the engine 1000 in addition to or instead of the throttle opening TH.

If the target gear speed is the second forward gear or higher, i.e., if two friction engagement elements must be engaged to form the target gear speed, the first hydraulic control unit 8240 outputs the drive current I, which quickly increases the target command pressure of the first engagement element, defined in the following paragraph, regardless of the input torque, to the solenoid that corresponds to the first engagement element.

Here, the first engagement element refers to a secondary engagement element if the target gear speed is not the fifth forward gear, and refers to the C2 clutch 3302 if the target gear speed is the fifth forward gear. This convention applies in the description below.

For example, if the target gear speed is the second forward gear, the first hydraulic control unit 8240 outputs to the SL(5) 4250 the drive current I(B1), which immediately maximizes the target command pressure P(B1) of the B1 brake 3311 to a maximum pressure, namely, the secondary engagement element that forms the second forward gear.

If the target gear speed is the fifth forward gear, the first hydraulic control unit 8240 outputs to the SL(2) 4220 the drive current I(C2), which quickly increases the target command pressure P(C2) of the C2 clutch 3302, namely, one primary engagement element that forms the fifth forward speed. In such case, the first hydraulic control unit 8240 takes into account that the C2 clutch 3302 is a primary engagement element, and increases the target command pressure. P(C2) in a preset manner to enhance suppression of engagement shock compared to when the target command pressure P(C2) is immediately increased to a maximum pressure.

Once the first engagement element has been engaged by the first hydraulic control unit 8240, the second hydraulic control unit 8250 outputs the drive current I to the solenoid that corresponds to the second engagement element so that the target command pressure of the second engagement element is gradually increased in accordance with the input torque.

Here, the second engagement element is another friction engagement element used with the first engagement element to form the target gear. The second engagement element refers to a primary engagement element if the target gear speed is not the fifth forward gear, and refers to the C1 clutch 3301 if the target gear speed is the fifth forward gear. This convention applies in the description below.

For example, if the target gear is the second forward gear, the second hydraulic control unit 8250 outputs to the SL(1) 4210 the drive current I(C1), which gradually increases in accordance with the input torque the target command pressure P(C1) of the C1 clutch 3301, namely, the primary engagement element that forms the second forward gear.

If the target gear is the fifth forward speed, the second hydraulic control unit 8250 outputs to the SL(1) 4210 the drive current I(C1), which gradually increases in accordance with the input torque the target command pressure P(C1) of the C1 clutch 3301 that differs from the C2 clutch 3302 among the two primary engagement elements that form the fifth forward gear. In the case described above, the second hydraulic control unit 8250 takes into account that the target command pressure P(C2) of the C2 clutch 3302, which is a first engagement element, is not immediately increased to the maximum pressure, and increases the target command pressure P(Cl) of the C1 clutch 3301 when the target command pressure P(C2) exceeds a preset hydraulic pressure or after a predetermined time has elapsed since the target command pressure P(C2) started increasing.

When increasing the target command pressure of the second engagement element, the second hydraulic control unit 8250 executes a quick-apply control for a predetermined time to increase the target command pressure to a predetermined hydraulic pressure in order to improve control response. After the quick-apply control, the second hydraulic control unit 8250 executes a low-pressure standby control to lower the target command pressure to a low standby hydraulic pressure in accordance with the input torque. After executing the low-pressure standby control, the second hydraulic control unit 8250 then executes a sweep control to increase the target command pressure to a maximum pressure using a sweep amount (an increase amount per unit time) in accordance with the input torque. However, the control of the second hydraulic control unit 8250 is not limited to this form of control.

According to the present embodiment, the N/D operation sensor 8210, the target gear speed calculation unit 8220, the torque reduction control unit 8320, the first hydraulic control unit 8240, and the second hydraulic control unit 8250 are all implemented through the execution of programs, stored in the storage unit 8300, by a CPU, namely, the computation processing unit 8200. In other words, the functions of the units are implemented through software. However, these units may be implemented using hardware. Also note that such programs are stored in a storage medium and installed in a vehicle.

Figure 6A:
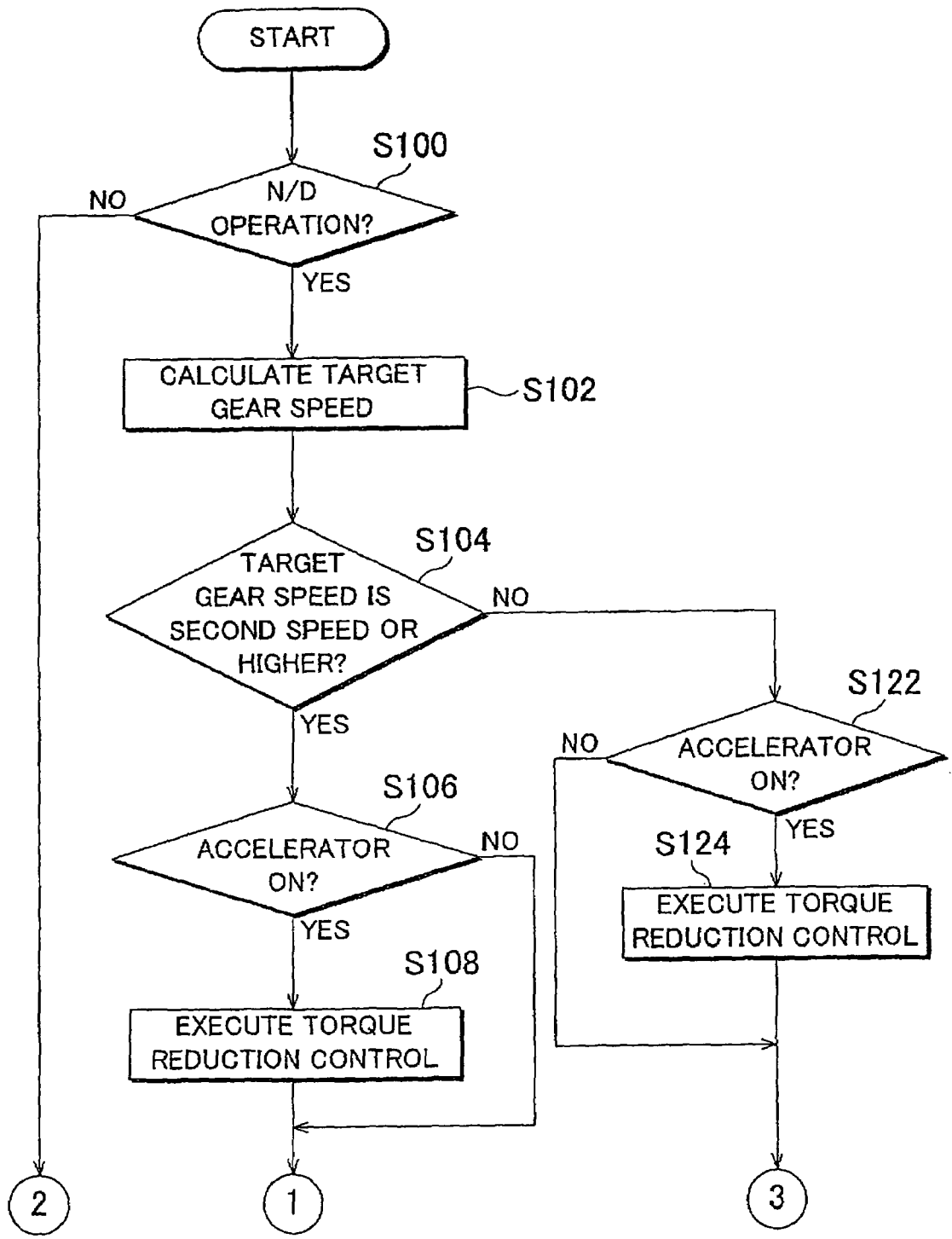
FIG. 6A and FIG. 6B are a flowchart that shows the control structure of a program executed by the ECU.
Figure 6B:
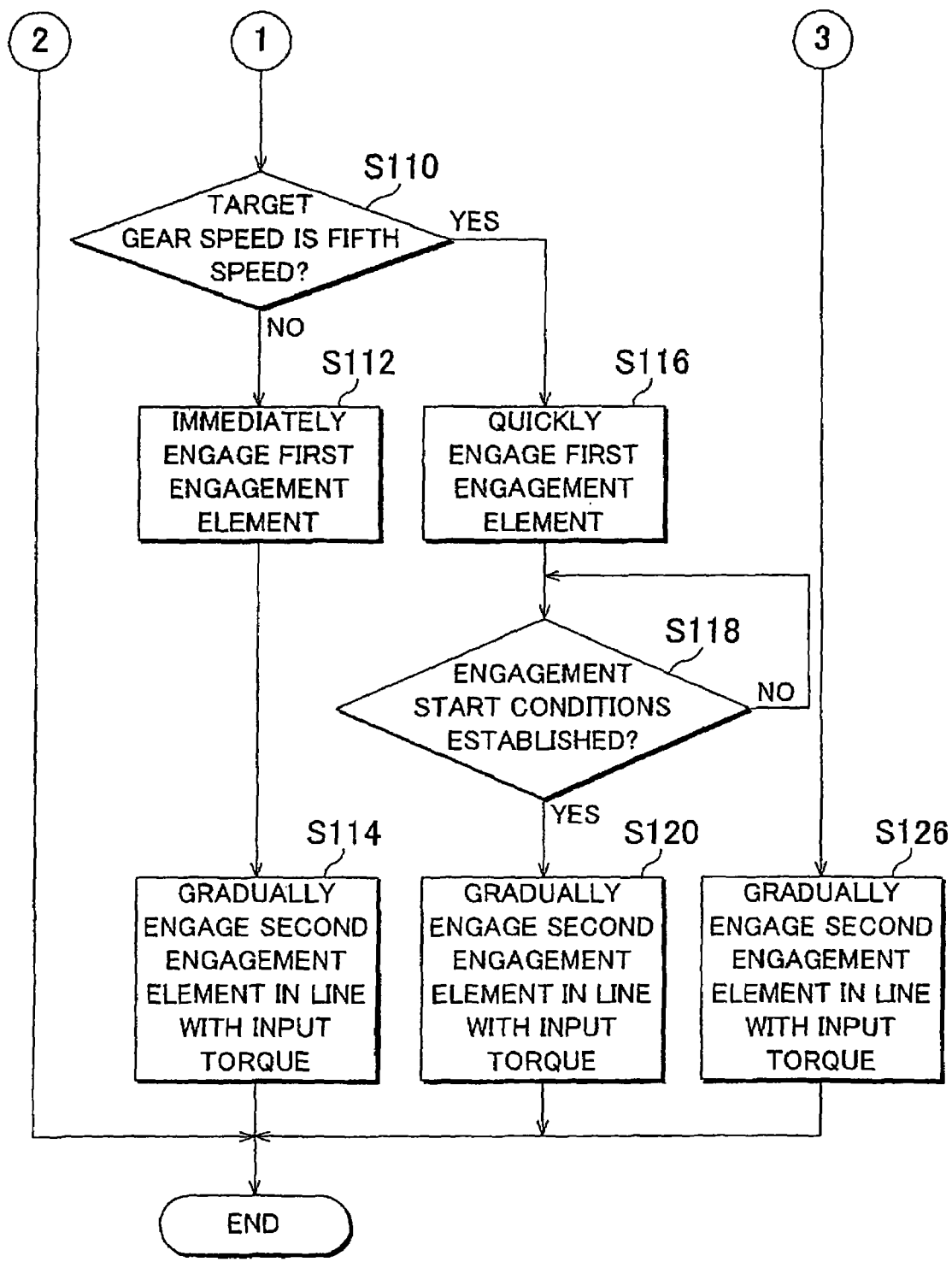

A control structure of a program executed by the ECU 8000 will be explained next with reference to FIG. 6A and FIG. 6B. This program is executed at prescribed intervals.

At step (which is abbreviated to "S" below) 100, the ECU 8000 determines whether an N/D operation has been performed based on the shift position SP. If an N/D operation has been performed (YES at S100), the process proceeds to S102. If an N/D operation has not been performed (NO at S100), the process ends.

At S102, the ECU 8000 determines the target gear based on the vehicle speed V, the accelerator operation amount ACC using the shift diagram.

At S104, the ECU 8000 determines whether the target gear is the second forward gear or higher (i.e., higher than the first forward gear). If the target gear is higher than the first forward gear (YES at S104), the process proceeds to S106. If the target gear is not the second forward gear or higher (NO at S104), the process proceeds to S122.

At S106, the ECU 8000 determines whether the accelerator is depressed based on the accelerator operation amount ACC.

If the accelerator is depressed (YES at S106), the process proceeds to S108. If the accelerator is not depressed (NO at S106), the process proceeds to S110.

At S108, the ECU 8000 executes the torque reduction control for the engine 1000 in accordance with the accelerator operation amount ACC.

At S110, the ECU 8000 determines whether the target gear speed is the fifth forward gear. If the target gear speed is the fifth forward gear (YES at S110), the process proceeds to S116. If the target gear speed is not the fifth forward gear (NO at S110), the process proceeds to S112.

At S112, the ECU 8000 immediately increases the target command pressure of the first engagement element to the maximum value regardless of the input torque.

At S114, the ECU 8000 gradually increases the target command pressure of the second engagement element in accordance with the input torque. As described above, the ECU 8000 then executes the quick-apply control for a predetermined time. After the quick-apply control, the ECU 8000 executes the low-pressure standby control for a predetermined time to reduce the target command pressure to the low standby hydraulic pressure in accordance with the input torque, and after the low-pressure standby control, executes the sweep control to increase the target command pressure to a maximum pressure using a sweep amount in accordance with the input torque.

At S116, the ECU 8000 quickly increases the target command pressure of the first engagement element (i.e., the target command pressure P(C2) of the C2 clutch 3302) in a preset manner regardless of the input torque. The preset manner involves setting an increase period from the start of increasing the target command pressure P(C2) until the maximum pressure is reached in advance, and then executing the quick-apply control, the low-pressure standby control, and the sweep control regardless of the input torque within the increase period. It should be noted that the increase period is set shorter than the time from the start of increasing the target command pressure of the second engagement element in accordance with the input torque until the maximum pressure is reached.

At S118, the ECU 8000 determines whether an engagement start condition of the second engagement element (the C1 clutch 3301) is satisfied. The ECU 8000 determines that the engagement start condition of the second engagement element is satisfied if the target command pressure P(C2) of the C2 clutch 3302 exceeds a prescribed hydraulic pressure, or if a predetermined time has elapsed after the target command pressure P(C2) of the C2 clutch 3302 starts increasing. If the engagement start condition of the second engagement element is satisfied (YES at S118), the process proceeds to S120. If the engagement start condition is not satisfied (NO at S118), the process returns to S118 and waits until the engagement start condition of the second engagement element is satisfied.

At S120, the ECU 8000 gradually increases the target command pressure of the second engagement element (the C1 clutch 3301) in accordance with the input torque. As described above, the ECU 8000 then executes the quick-apply control for a predetermined time. After the quick-apply control, the ECU 8000 executes the low-pressure standby control for a predetermined time to reduce the target command pressure to the low standby hydraulic pressure in accordance with the input torque, and after the low-pressure standby control, executes the sweep control to increase the target command pressure to a maximum pressure using a sweep amount in accordance with the input torque. The low standby hydraulic pressure and the sweep amount in this process may be similar to or different from that at S114.

At S122, the ECU 8000 determines whether the accelerator is depressed based on the accelerator operation amount ACC. If the accelerator is depressed (YES at S122) the process proceeds to S124. If the accelerator is not depressed (NO at S124), the process proceeds to S126.

At S124, the ECU 8000 executes the torque reduction control for the engine 1000 in accordance with the accelerator operation amount ACC. This process may be similar to or different from the process at S108.

At S126, the ECU 8000 gradually increases the target command pressure P(C1) of the C1 clutch 3301 in accordance with the input torque. This process may be similar to or different from the processes at S114 or S120.

Figure 7:
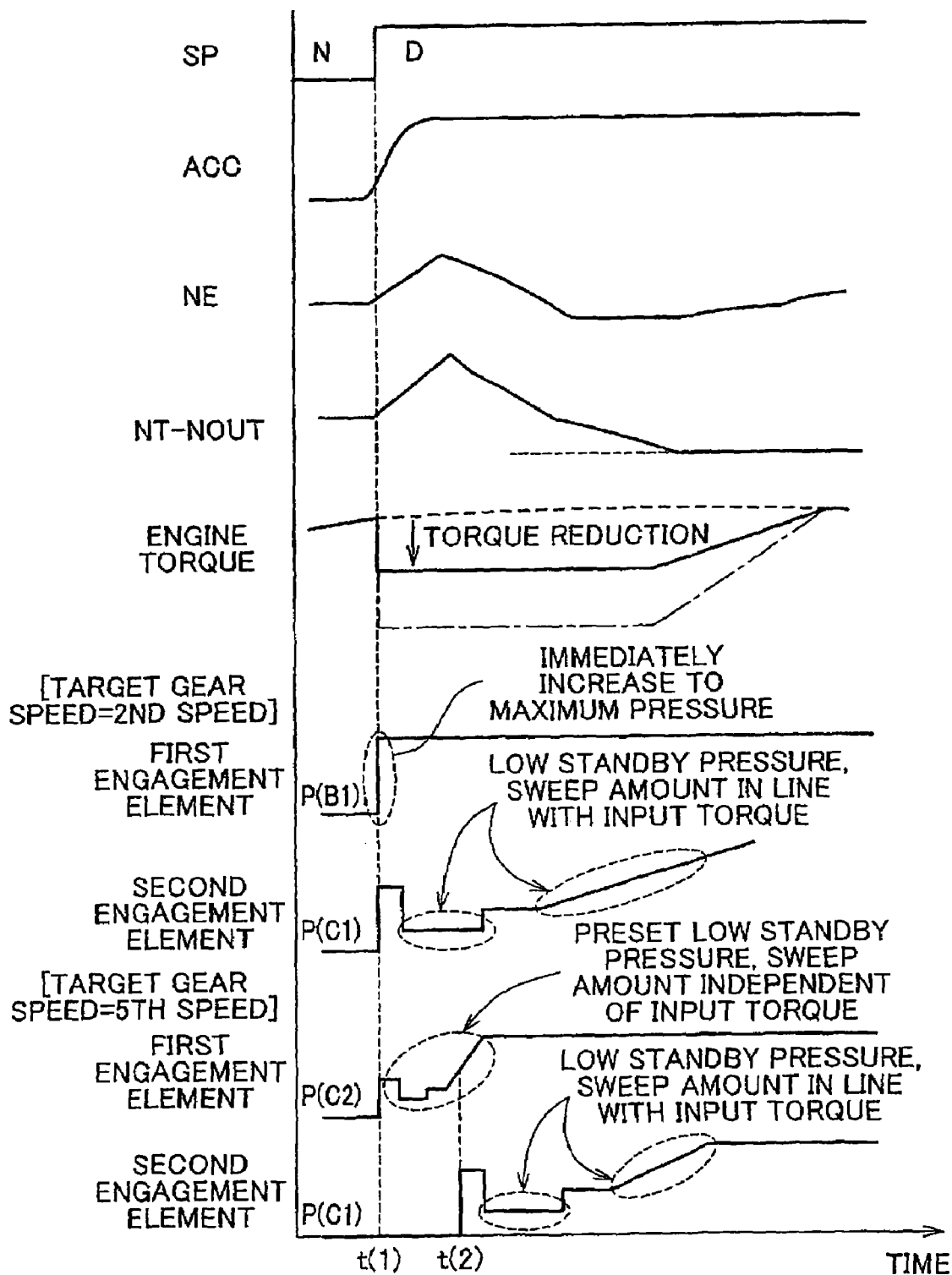
FIG. 7 is a timing chart for a target command pressure of a first engagement element and a target command pressure of a second engagement element controlled by the ECU.

The operation of the ECU 8000, which is the control device of a vehicle according to the present embodiment, as based on the structure and flowchart described above will be explained next with reference to FIG. 7.

This example assumes that an N/D operation is performed and depresses the accelerator pedal 8008 at a time t(1). In such case, the N/D operation (YES at S100) is followed by calculation of the target gear (S102). The target gear is then calculated as the second forward gear (YES at S104), and the accelerator is depressed (YES at S106). Therefore, the engine torque is reduced as shown in FIG. 7 (S108).

The description below is divided into an example where the target gear is the second forward gear (i.e., a primary engagement element and a secondary engagement element are engaged to form the target gear) and an example where the target gear is the fifth forward gear (i.e., two primary engagement elements are engaged to form the target gear).

[Second Forward Gear as Target Gear]

The target command pressure P(B1) of the B1 brake 3311, which is a first engagement element (a secondary engagement element for forming the second forward gear), is immediately increased to the maximum pressure (S112), and the target command pressure P(C1) of the C1 clutch 3301, which is a second engagement element (a primary engagement element for forming the second forward gear), is gradually increased using a low standby hydraulic pressure and a sweep amount in accordance with the input torque.

Thus, when a primary engagement element and a secondary engagement element are engaged, immediately increasing the target command pressure of the secondary engagement element, the engagement of which does not change the output torque, to the maximum pressure immediately ends engagement of the secondary engagement element. Afterwards, the target command pressure of the primary engagement element, the engagement of which does change the output torque, is gradually increased in accordance with the input torque in a manner similar to the engagement of one engagement element.

Therefore, a more complex engagement hydraulic control than that used to simultaneously increase the hydraulic pressure fed to two engagement elements in accordance with the input torque may be avoided. It is also possible to suppress fluctuations in the balance between the engagement state of the primary engagement element and the engagement state of the secondary engagement element. Consequently, there is no need to excessively reduce an engine torque reduction amount indicated by a dashed line in FIG. 7 in order to suppress engagement shock. Thus, the vehicle is accelerated in accordance with the depression of the accelerator while suppressing engagement shock, and vehicle travel in line with the driver's intent can be achieved.

[Fifth Forward Gear as Target Gear]

Among the two primary engagement elements used to form the forward fifth speed, namely, the C1 clutch 3301 and the C2 clutch 3302, first, the target command pressure P(C2) of the C2 clutch 3302 is quickly increased using a preset low standby hydraulic pressure and a sweep amount unrelated to the input torque (S116).

If the target command pressure P(C2) of the C2 clutch 3302 exceeds the preset hydraulic pressure at a time t(2) thereafter (YES at S118), the target command pressure P(C1) of the remaining C1 clutch 3301 is gradually increased using a low standby hydraulic pressure and a sweep amount in accordance with the input torque.

Thus, if two primary engagement elements must be engaged, one of the primary engagement elements may be quickly engaged to a degree that does not generate shock. When engagement of one of the primary engagement elements is substantially complete, the target command pressure of the other primary engagement element is gradually increased in accordance with the input torque in a manner similar to the engagement of first engagement element. Therefore, similar to the engagement of a primary engagement element and a secondary engagement element, a more complex engagement hydraulic control may be avoided, and acceleration may be achieved in line with the driver's intent while also suppressing engagement shock.

As described above, according to the control device of the present embodiment, if an N/D operation requires the respective engagement of two engagement elements, one of the engagement elements is engaged before engagement of the other engagement element. Accordingly, fluctuations in the balance between the engagement state of one engagement element and the engagement state of the other engagement element may be suppressed. Thus, even if the accelerator depressed immediately after the N/D operation, it is possible to suppress engagement shock without excessively reducing the engine torque. Thus, the vehicle may be accelerated in accordance with the depression of the accelerator while suppressing engagement shock.

The embodiment described herein is intended for purposes of illustration only and should not be considered as limiting the scope of the present invention. The scope of the present invention is specified by the claims rather than the above description, and includes any modifications within the scope of the claims.

What is claimed is:

1. A control device for a vehicle, wherein the vehicle includes an automatic transmission that includes a plurality of engagement elements and a hydraulic circuit that controls a hydraulic pressure fed to the plurality of engagement elements, wherein the automatic transmission changes a speed of a rotation of a drive source and outputs the rotation whose speed has been changed, and the plurality of engagement element is released when a running position selected by a driver is a neutral position, the control device comprising:
    a determination unit that determines whether the running position has been changed from the neutral position to a forward running position by a driver;
    a reduction unit that controls the drive source such that an output torque of the drive source is lower than a torque in accordance with an accelerator opening, if the determination unit determines that the running position has been changed to the forward running position;
    a calculation unit that calculates a target gear speed in accordance with a vehicle speed, if it is determined by the determination unit that the running position has been changed to the forward running position; and
    a control unit that controls the hydraulic circuit such that if the target gear speed calculated by the calculation unit is a gear speed formed by engaging at least two or more engagement elements, parts of the two or more engagement elements is engaged before engagement of remaining part of the two or more engagement elements, wherein:
    the plurality of engagement elements include a primary engagement element through which an input torque input from the drive source to the automatic transmission is output from the automatic transmission even if singly engaged, and a secondary engagement element through which the input torque is not output if singly engaged,
    the control unit determines whether a combination of the two or more engagement elements used to form the target gear speed is a combination of the primary engagement element and the secondary engagement element, or a combination of the primary engagement elements;
    if the combination of the two or more engagement elements is the combination of the primary engagement element and the secondary engagement element, the control unit executes a first control that immediately increases a hydraulic pressure fed to the secondary engagement element to a maximum pressure regardless of the input torque, and increases a hydraulic pressure fed to the primary engagement element in accordance with the input torque, thereby engaging the secondary engagement element before engagement of the primary engagement element; and
    if the combination of the two or more engagement elements is the combination of the primary engagement elements, the control unit executes a second control that increases a hydraulic pressure fed to part of the primary engagement elements by a preset increase amount per unit time regardless of the input torque, and increases a hydraulic pressure fed to remaining part of the primary engagement elements in accordance with the input torque, thereby engaging the part of the primary engagement elements before engagement of the remaining part of the primary engagement elements.

2. The control device according to claim 1, wherein in the second control, the hydraulic pressure fed to the part of the primary engagement element is increased to a predetermined hydraulic pressure, and then the hydraulic pressure fed to the remaining part of the primary engagement element is increased.

3. The control device according to claim 1, wherein in the second control, a time elapsed from when the hydraulic pressure fed to the part of the primary engagement element starts increasing until a maximum pressure is reached is set shorter than a time elapsed from when the hydraulic pressure fed to the remaining part of the primary engagement element starts increasing until a maximum pressure is reached.

4. A control method for a vehicle, wherein the vehicle includes an automatic transmission that includes a plurality of engagement elements and a hydraulic circuit that controls a hydraulic pressure fed to the plurality of engagement elements, wherein the automatic transmission changes a speed of a rotation of a drive source and outputs the rotation whose speed has been changed, and the plurality of engagement element is released when a running position selected by a driver is neutral position, the control method comprising:
    a determination step of determining whether the running position selected by the driver has been changed from the neutral position to a forward running position;

a reduction step of controlling the drive source such that an output torque of the drive source is lower than a torque in accordance with an accelerator opening, if it is determined that the running position has been changed to the forward running position in the determination step;

a calculation step of calculating a target gear speed in accordance with a vehicle speed, if it is determined that the running position has been changed to the forward running position in the determination step; and a control step of controlling the hydraulic circuit such that if the target gear speed calculated in the calculation step is a gear speed formed by engaging at least two or more engagement elements, part of the two or more engagement elements is engaged before engagement of remaining part of the two or more engagement elements, wherein:

the plurality of engagement elements include a primary engagement element through which an input torque input from the drive source to the automatic transmission is output from the automatic transmission even if singly engaged, and a secondary engagement element through which the input torque is not output if singly engaged, the control step includes:
- a step of determining whether a combination of the two or more engagement elements used to form the target gear speed is a combination of the primary engagement element and the secondary engagement element, or a combination of the primary engagement elements;
- a step of executing a first control that immediately increases a hydraulic pressure fed to the secondary engagement element to a maximum pressure regardless of the input torque, and increases a hydraulic pressure fed to the primary engagement element in accordance with the input torque, thereby engaging the secondary engagement element before engagement of the primary engagement element, if the combination of the two or more engagement elements is the combination of the primary engagement element and the secondary engagement element; and
- a step of executing a second control that increases a hydraulic pressure fed to part of the primary engagement elements by a preset increase amount per unit time regardless of the input torque, and increases a hydraulic pressure fed to remaining part of the primary engagement elements in accordance with the input torque, thereby engaging the part of the primary engagement elements before engagement of the remaining part of the primary engagement elements, if the combination of the two or more engagement elements is the combination of the primary engagement elements.

5. The control method according to claim 4, wherein in the step of executing the second control, the hydraulic pressure fed to the part of the primary engagement element is increased to a predetermined hydraulic pressure, and then the hydraulic pressure fed to the remaining part of the primary engagement element is increased.

6. The control method according to claim 4, wherein in the step of executing the second control, a time elapsed from when the hydraulic pressure fed to the part of the primary engagement element starts increasing until a maximum pressure is reached is set shorter than a time elapsed from when the hydraulic pressure fed to the remaining part of the primary engagement element starts increasing until a maximum pressure is reached.

* * * * *